United States Patent [19]
Nishii et al.

[11] Patent Number: 5,287,484
[45] Date of Patent: Feb. 15, 1994

[54] MULTI-PROCESSOR SYSTEM FOR INVALIDATING HIERARCHICAL CACHE

[75] Inventors: Osamu Nishii, Kokubunji; Kunio Uchiyama; Hirokazu Aoki, both of Hachioji; Takashi Kikuchi, Akishima; Yasuhiko Saigou, Fuchu, all of Japan

[73] Assignees: Hitachi, Ltd.; Hitachi VLSI Engineering Corp., Tokyo, Japan

[21] Appl. No.: 976,645

[22] Filed: Nov. 13, 1992

Related U.S. Application Data

[63] Continuation of Ser. No. 540,860, Jun. 20, 1990, abandoned.

[30] Foreign Application Priority Data

Jun. 21, 1989 [JP] Japan .................................. 1-156804

[51] Int. Cl.$^5$ ................................................ G06F 12/08
[52] U.S. Cl. ........................... 395/425; 364/DIG. 1; 364/243; 364/243.41; 364/243.44; 364/243.45; 364/228.3
[58] Field of Search ............................. 395/425, 400

[56] References Cited

U.S. PATENT DOCUMENTS

| | | | |
|---|---|---|---|
| 4,464,712 | 8/1984 | Fletcher | 395/425 |
| 4,939,641 | 7/1990 | Schwartz | 395/425 |
| 5,056,002 | 10/1991 | Watanabe | 395/425 |
| 5,058,006 | 6/1988 | Durdan | 395/425 |

FOREIGN PATENT DOCUMENTS 027819  8/1988  European Pat. Off. .

OTHER PUBLICATIONS

Wescon Conference Record, "The NS32532-High Performance and Software Compatibility", V. 21, No. 3/4, Los Angeles, Calif., 1987, pp. 1-7.
IBM Technical Disclosure Bulletin, "Second Level Cache for NF Systems", IBM Corp., V. 27, No. 1A, Jun. 1884.
Alan J. Smith, "Cache Memories", ACM, Computing Surveys, vol. 14, No. 3, 1982, pp. 473-530 (provided in English).
Nikkei Electronics, Oct. 26, 1981, pp. 176-190 (English translation unavailable).
"Technical Research Report of the Institute of Electronics, Information and Communication Engineers of Japan", ICD 89-8-15, Apr. 21, 1989, pp. 29-36 (English translation unavailable).
James R. Goodman, "Using Cache Memory to Reduce Processor-Memory Traffic", 10th Annual International Symposium on Computer Architecture, 1983, pp. 124-131 (provided in English).

*Primary Examiner*—Debra A. Chun
*Attorney, Agent, or Firm*—Fay, Sharpe, Beall, Fagan, Minnich & McKee

[57] ABSTRACT

A non-shared system with respect to an outside and an inside cache in a multi-processor system has multi-layer hierarchical cache. An invalidation address on a main memory address bus 31 in company with the rewriting of a main memory 30 is transmitted via a first and a second path 35, 36 to inside caches 11, 21 so as to invalidate these inside caches 11, 21. The invalidation address is transmitted to the outside caches 12, 22 via the bidirectional connections between the main memory address bus 31 and outside caches 12, 22 so as to invalidate these outside caches 12, 22. It is extremely improbable for the address of access for writing to the transmitted to the main memory address bus 31 because the outside caches 12, 22 are operated in either copy back or write once system. As a result, even though the invalidation address is transmitted to the outside caches 12, 22 via the bidirectional connections between the main memory address bus 31 and the outside caches 12, 22, it is extremely improbably for the address of access for writing to conflict with a signal on the bidirectional connection.

10 Claims, 5 Drawing Sheets

MULTI-PROCESSOR SYSTEM FOR INVALIDATING HIERARCHICAL CACHE

This application is a continuation application of co-pending U.S. application Ser. No. 07/540,860, filed Jun. 20, 1990, now abandoned.

FIELD OF THE INVENTION

The present invention relates to a multi-processor system having a plurality of processors, a main memory, and cache memories having a plurality of hierarchies.

2. Description of the Prior Art

A discussion has already been devoted to cache memories in detail in ACM, Computing Surveys, Vol. 14, No. 3, pp. 473-530, 1982.

The cache memory, though it has a capacity smaller than that of a main memory, is capable of high-speed access (for read/write) and located substantially close to a processor so that the memory may be accessible at a high speed.

If data is read from the main memory each time an instruction is executed, high-speed processing cannot be hoped for because the time required to transfer data between the main memory and the processor is several times greater than the processing time in the processor. Although the processor has the whole main memory as an object of access, on the other hand, access is centered upon only part thereof for a short period of time. If part of the data stored in the main memory is copied into the cache memory so as to allow the processor to gain access thereto, the access time may be shortened on the average.

The cache memory controls memory in the form of a block of suitable size as a unit. Each block corresponds to a certain location of the main memory and holds a copy of data at that location. This memory is called a data array. Needless to say, it is possible to change in a dynamic mode the location of the main memory to which each block corresponds and The address data is also held in the cache memory. This memory portion is called an address array.

In order for the processor to gain access to the cache memory in most cases, the data that has frequently been accessed recently should be placed in the cache. On the contrary, the data that has not been accessed recently should not be placed in the cache. The cache memory is so controlled as to satisfy the aforementioned requirements. Taking a case of reading as an example, such control will subsequently be described.

When data in a cache is accessed, a block to which the data belongs is kept, whereas when data absent from the cache is accessed, one block including the data in the main memory is transferred into the cache. Another block that has remained unused recently in the cache is expelled instead.

As described in the aforementioned surveys, ACM, Computing Surveys, Vol. 14, No. 3, pp. 473-530, 1982, a "write through" and a "copy back" system are known as store methods for the cache.

In the case of the write through system, the inside cache and the outside main memory both are written when a processor hits the cache for writing and contents of both are caused to coincide with each other at all times.

In the case of the copy back system, on the other hand, the outside main memory is not written, whereas only the inside cache is written when the processor hits the cache for writing.

A comparison between the two systems shows that, because the copy back system is more complicated than the write through system in terms of control, the former requires a greater amount of hardware for controlling purposes. This is particularly conspicuous in control for maintaining the coherence of the contents of the respective caches in a shared memory type multiprocessor system.

In view of performance, however, writing to the main memory can be dispensed with since the main memory is not written when the cache is hit in the copy back system. Therefore, the copy back system is advantageous in that omission of write-to-main-memory time contributes to reducing traffic to the main memory. In the multi-processor system, importance should be attached to reduction in traffic to the main memory in improving total system performance.

A description will subsequently be given of a hierarchical cache. A hierarchical cache memory designates an arrangement of a plurality of cache memories connected in series between a processor and a main memory. An example of the arrangement is disclosed in "Nikkei Electronics", Oct. 26, 1981, pp. 176-190.

With the adoption of the hierarchical cache arrangement, it is anticipated that the effect of the cache can be heightened.

In the data processing system disclosed in the "Nikkei Electronics", above there is provided a processor unit (CPU) comprising an instruction control unit, an operation control unit and a cache memory (buffer storage). In addition, another cache memory (global buffer storage) is disposed between the CPU and the main memory. In this case, the cache in the CPU is an inside cache physically and logically, the other cache memory being an outside cache. The outside cache operates while it regards the original processor comprising the instruction control unit and, the operation control unit in combination which the inside cache as one processor.

In this way, a hierarchical cache having more than three layers may be considered likewise, though the "Nikkei Electronics" discloses a two-layer hierarchical cache. The outermost cache in the system having more than three layers of hierarchical cache is called an outside cache, whereas the remaining cache is called an inside cache in the present invention. It should be noted accordingly that what directly gains access to the main memory is the outside cache.

Moreover, the "Nikkei Electronics" also discloses a multi-processor system in such a form that a plurality of processors (CPU) possess a main memory and outside caches (global buffer storage) in common and that each of the inside caches store discrete data for the processor related thereto.

More specifically, write control under the store through system (write through system) is adopted between the inside cache and the shared outside cache and when the shared outside cache is updated via one inside cache, the other inside cache is invalidated by causing the shared outside cache to send an invalidation address of the block thus updated to the other inside cache, whereby the contents of the inside cache and the shared outside cache are made to coincide with each other.

On the other hand, it is also disclosed to adopt a swap system (copy back system) between the shared outside cache and the main memory to reduce frequency of access to the main memory.

"Technical Research Report of The Institute of Electronics, Information and Communication Engineers, of Japan" ICD 89-8-15, Apr. 21, 1989, pp. 29-36 discloses a case where a microprocessor assumes the role of monitoring a system address bus and is provided with a bus monitoring function for clearing one block including the data rewritten by another bus master out of the data registered in a cache memory within the microprocessor to deal with the rewriting of the main memory by that another bus master. With this function, the coherence of the inside cache to the main memory is maintained even in the multiprocessor environment. In order to implement the function concretely, an additional 28-bit monitoring address is supplied to the microprocessor.

An article "Using Cache Memory to Reducing Processor-Memory Traffic" by J.R. Goodman is reported in the 10th Annual International Symposium on Computer Archietcture, pp. 124-131, 1983. In that article, there is proposed a write-once system as a new system different from the conventional write through and the copy back system. The write-once system is explained as what is capable of solving the data updating problem with minimal bus traffic. In the write-once system, two bits are associated with each other in each storage block of a cache and the two bits define four states of the associated data as follows:

The first state to start with shows that no data exists in the block in an invalid state.

The second state shows that data is read from a main memory in the valid state and exists in the block that has not been updated.

The third state is a reserved state in which the data in the block is locally modified exactly once and the modified data is brought into the cache and the change has been transmitted to the main memory.

The fourth state is a dirty state in which the data in the block is locally modified more than once and brought into the cache and the latest change has not been transmitted to the main memory.

The article by Goodman also discloses the necessity of state bit pairs accessed concurrently with an address tag by a CPU and quick access to the address tag, which can readily the accomplished by creating (the same) two copies of tag memory, by duplication of which collisions between a cache invalidation request and a normal cache reference can be resolved.

SUMMARY OF THE INVENTION

The present invention is based on the following results of studies when the present inventors studied, prior to the present invention, a system having different outside and inside caches on a processor basis (non-shared system with respect to the outside and the inside cache) in a multi-processor system having a two-layer hierarchical cache.

More specifically, the problems brought about when the processor (CPU) demands write access to inside and outside cache memories and demands to invalidate the cache, and concerning reduction in the number of address terminals of the outside cache memory have not fully been taken into consideration in any system having a known hierarchical cache prior to the present invention.

Therefore, two principal objections of the present invention are, in a non-shared multi-processor system with both the outside and the inside caches in a hierarchical cache, to solve the problems brought about when a processor (CPU) demands write access to the inside and outside cache memories and demands to invalidate the cache, and to reduce the number of address terminals of the outside cache memory.

In order to accomplish the foregoing objects, a multi-processor system as a representative embodiment of the present invention comprises a first processor (10) for generating addresses;

a first inside cache memory (11) to be accessed by the first processor (10) in accordance with the address;

a first outside cache memory (12) to be accessed by the first processor (10) in accordance with the address;

a second processor (20) for generating addresses;

a second inside cache memory (21) to be accessed by the second processor (20) in accordance with the address;

a second outside cache memory (22) to be accessed by the second processor (20) in accordance with the address;

an address bus (31) to which the address transmitted from the first processor (10) via the first outside cache memory (12) and the address transmitted from the second processor (20) via the second outside cache memory (22) are transmitted;

a data bus (32) connected via the first outside cache memory (12) to the first processor (10) and the first inside cache memory (11) and connected via the second outside cache memory (22) to the second processor (20) and the first inside cache memory (21);

memory means (30) connected to the address bus (31) and the data bus (32); and paths (35, 36) for respectively connecting the address bus (31) with the first inside cache memory (11) and the second inside cache memory (21) by circumventing the first outside cache memory (12) and the second outside cache memory (22), wherein the first inside cache memory (11) and the second inside cache memory (21) operate in a write through system, wherein the first outside cache memory (12) and the second outside cache memory (22) operate in at least one of the copy back and write once systems.

wherein the connection between the first outside cache memory (12) and the address bus (31) is such that addresses are bidirectionally transmitted therebetween, and wherein the connection between the second outside cache memory (22) and the address bus (31) is such that addresses are bidirectionally transmitted therebetween.

In the multi-processor system thus constructed, the invalidation address on the address bus (31) which is generated in company with the rewriting of the memory means (30) is transmitted via the path (35, 36) to the first and the second inside cache (11, 21), so that the inside caches are invalidated. Moreover, since the invalidation address is transmitted via the bidirectional connections between the address bus (31) and the first and the second outside cache (12, 22), the outside caches are invalidated. As a result, the coherence of the memory means (30) in the multiprocessor system to the inside and the outside caches (11, 21, 12, 22) is maintained.

In addition, the first and the second outside cache memory (12, 22) operate in at least one of the copy back and write once systems. At the time of write access from the first processor (10) or second processor (20), the address of the write access is very likely to hit the first outside cache memory (12) or second outside cache memory (22).

Since no address of the write access is transmitted to the address bus (31) at the time of hit in the copy back system, it is extremely improbable for the address of the write access to conflict with the signal thereof even though the invalidation address is transmitted via the bidirectional connections between the address bus (31) and the first and the second outside cache (12, 22) to the first and the second outside cache (12, 22).

At the time of hit in the write-once system, moreover, though the outside cache and the main memory are accessed for writing when data of a specific address is modified exactly once to store the data, only the outside cache is accessed for writing when the data of the specific address is modified more than once to store the data, so that the main memory is prevented from being accessed for writing. When the data of the specific address is modified more than once, the address of the write access is not transmitted to the address bus (31) and it is extremely improbable for the address of the write access to conflict with the signal thereof even though the invalidation address is transmitted via the bidirectional connections between the address bus (31) and the first and the second outside cache (12, 22) to the first and the second outside cache (12, 22).

Therefore, the bidirectional connection of the outside caches (12, 22) to the address bus (31) results in reducing the number of address terminals of the outside caches (12, 22).

These and other objects and other features of the present invention will become apparent in the detailed description which follows.

DESCRIPTION OF THE PREFERRED EMBODIMENT

Outline of Multi-Processor System Configuration

Figure 1:
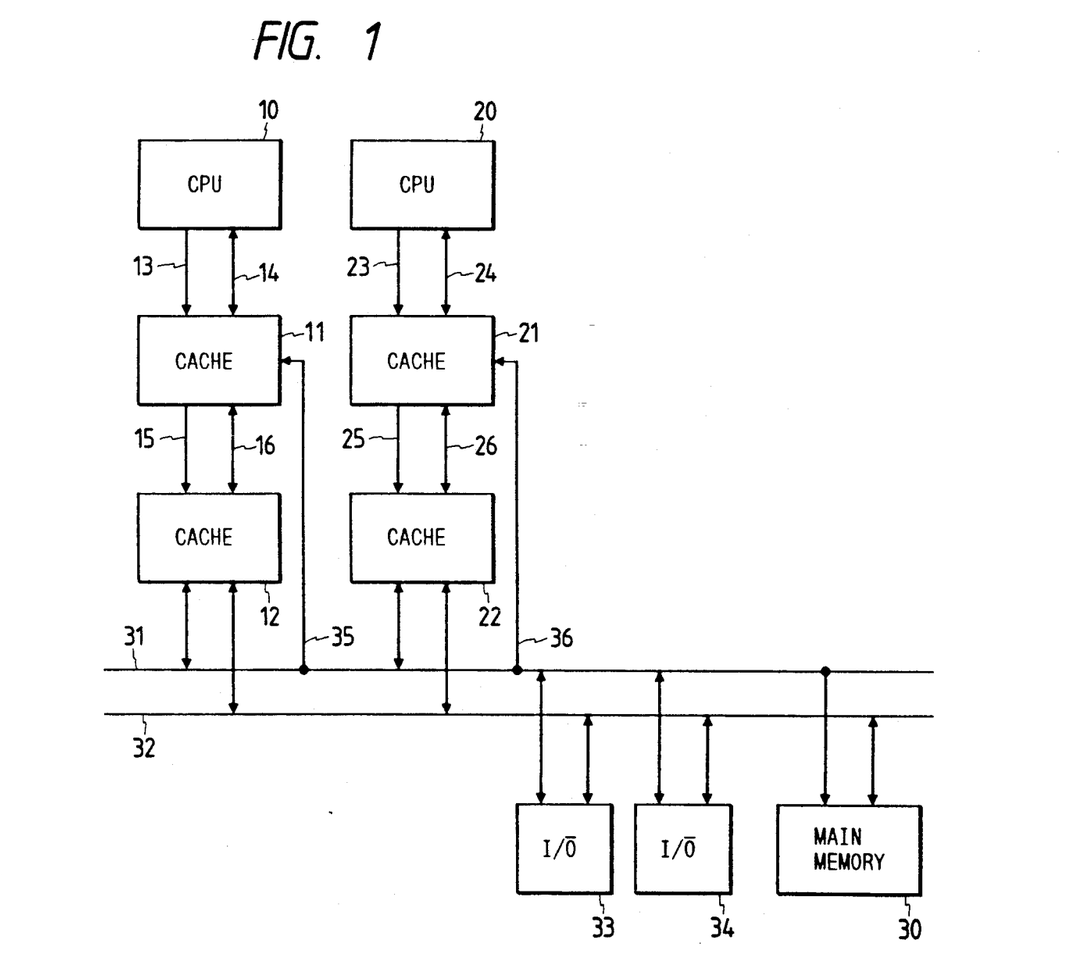
FIG. 1 is a block diagram of a multi-processor system embodying the present invention.

FIG. 1 shows an overall data processing system configuration embodying the present invention. The present data processing system is a multi-processor system comprising two processors (CPU: Central Processing Unit) 10, 20; two inside caches 11, 21, two outside caches 12, 22, two input/output devices 33, 34, a main memory 30, a main memory bus address line 31, and a main memory bus data line 32.

The main memory 30 is commonly accessed by the two processors 10, 20, whereas the inside and the outside caches 11, 12 are privately accessed for writing only with an address from the processor 10, the inside cache and the outside caches 21, 22 being privately accessed for writing only with an address from the processor 20.

The processor 10 and the inside cache 11 give and receive addresses and data using a processor address line 13 and a processor data line 14. The inside cache 11 and the outside cache 12 give and receive addresses and data using an address line 15 between the caches and a data line 16 therebetween. The connection between 20 and 26 is similar to that between 10 and 16.

The main memory bus address line 31 and the main memory bus data line 32 are generally used to give and receive addresses and data to and from the main memory 30. The main memory bus address line 31 and the main memory bus data line 32 are connected to the outside caches 12, 22 and the input/output devices 33, 34.

As described later, the main memory bus address line 31 is so arranged as to supply addresses to the respective inside caches 11, 21 via a first and a second path 35, 36. In this case, bus control signals such as a read/write discriminating signal, a bus start signal and the like are considered as being totally included in the main memory address line 31. Therefore, the read/write discriminating signal, the bus start signal and the like are being fed into the inside caches 11, 21.

Although addresses are unidirectionally transmitted from the processor 10 via the processor address line 13 and the address line 15 between the caches to the inside cache 11 and the outside cache 12, they are not allowed to be transmitted in the opposite direction through the lines 13, 15. In the same way, since addresses are unidirectionally transmitted from the processor 20 via a processor address line 23 and an address line 25 between the caches to the inside cache 21 and the outside cache 22, they are not allowed to be transmitted in the opposite direction through the lines 23, 25.

As a result, the inside cache 11 and the outside cache 12 are accessed according to the address from the processor 10, whereas the inside cache 21 and the outside cache 22 are accessed according to the address from the processor 20.

The main memory bus address line 31 receives addresses from the processor 10 via the outside cache 12, and addresses from the processor 20 via the outside cache 22 and further addresses from the input/output devices 33, 34.

Consequently, the main memory 30 is accessed commonly with the addresses from the two processors 10, 20.

The main memory bus data line 32 is connected via the outside cache 12 to the processor 10 and the inside cache 11, and via the outside cache 22 to the processor 20 and inside cache 21. In other words, data can be transmitted bidirectionally between the outside cache 12, the processor 10 and the inside cache 11 via the processor data line 14 and the data line 16 between the caches, whereas data can be transmitted bidirectionally between the outside cache 22, the processor 20 and the inside cache 21 via the processor data line 24 and the data line 26 between the caches.

Moreover, data can be transmitted bidirectionally between the outside caches 12, 22, the input/output devices 33, 34, the main memory 30 and the main memory bus data line 32.

On the other hand, there are disposed in the system the first path 35 for connecting the main memory bus address line 31 and the inside cache 11 by circumventing the outside cache 12, and the second path 36 for connecting the main memory bus address line 31 and the inside cache 21 by circumventing the outside cache 22 in the system.

As for the process within the cache when the cache is accessed or writing, there are three systems: the write through system, the copy back system and the write-once system as described above. In the write through system, its private cache and the outside thereof are written at the time of cache-hit every time the write access is gained. In the copy back system, only its private cache is written at the time of cache-hit but the outside thereof is not written. In the write-once system, though the outside cache ad the main memory are accessed for writing when a specific data address is modified exactly once to store the data modified exactly once, only the outside cache is accessed for writing when the specific data address is modified more than once to store the data modified more than once but the main memory is unlikely to be accessed for writing.

In this embodiment, the inside caches 11, 21 operate in the write through system, whereas the outside caches 12, 22 operates in the copy back or write once system, depending on the situation.

Moreover, data can be transmitted bidirectionally between the main memory bus address line 31, the outside caches 12, 22 and the input/output devices 33, 34, whereas addresses are transmitted only unidirectionally from the main memory bus address line 31 to the main memory 30.

Summary of Hierarchical Cache Invalidating Operation

Under the multi-processor system stated above, the invalidation address on the main memory address bus 31 in company with the rewriting of the main, memory 30 is transmitted via the first and the second paths 35, 36 to the inside caches 11, 21, whereby the inside caches 11, 21 are invalidated.

Moreover, the invalidation address is transmitted to the outside caches 12, 22 via the bidirectional connections between the main memory address bus 31 and the outside caches 12, 22, whereby these outside caches 12, 22 are invalidated. The coherence of the inside and outside caches 11, 21, 12, 22 to the main memory 30 is thus maintained in the multi-processor system.

Summary of Signal Conflict Evading Operation

The outside caches 12, 22 operate in either copy back or write-once system. It is therefore highly probable for the write access address to hit the outside cache memory 12 or 22 when the processor 10 or 20 gains the write access thereto.

At the time of hit, in the copy back system the address of the write access is not transmitted to the main address bus 31 and it is extremely improbable for the address of the write access to conflict with the invalidation address thereof even though the invalidation address is transmitted to the first and the second outside cache 12, 22 via the bidirectional connections between the address bus 31 and the first and the second outside cache 12, 22.

At the time of hit in the write-once system, moreover, though the outside cache and the main memory are accessed for writing when a data with specific address is modified exactly once to store the data, only the outside cache is accessed for writing when the data with the specific address is modified more than once and the main memory is not accessed for writing. When the data with the specific address is modified more than once, the address of the write access is not transmitted to the address bus 31 and it is extremely improbable for the address of the write access to conflict with the invalidation address thereof even though the invalidation address is transmitted to the first and the second outside cache 12, 22 via the bidirectional connections between the address bus 31, the first and the second outside cache 12, 22.

Internal Configuration of Inside Cache

Figure 2:
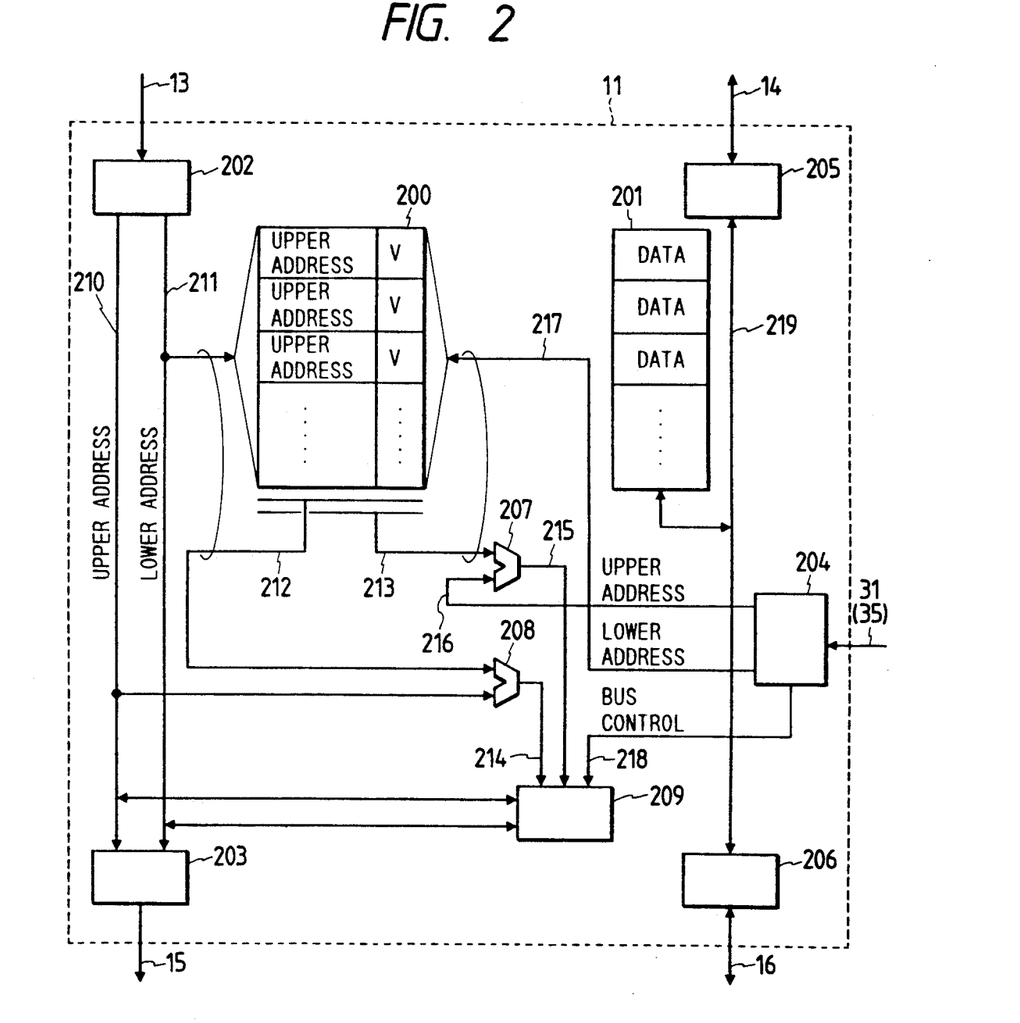
FIG. 2 is a block diagram showing the internal configuration of an inside cache within the system of FIG. 1.

FIG. 2 shows an internal configuration of the inside cache 11.

An address array 200 has rows of memory units, each row comprising an upper address, and a 1-bit flag (Vbit) indication that memory of the corresponding data array are effective. The memory unit is used for any one row to be selected by a lower address 211 of an input address. Although the address array 200 receives the lower address 211 from the processor 10 and a lower address 317 from the main memory address bus 31 as inputs, it is capable of independently acting on the two inputs because the memory unit comprises a dual port RAM and its different rows can also be accessed simultaneously.

A data array 201 has the same number of rows as those of the address array 200, the row comprising a memory unit for storing data equivalent to one block. The data can be accessed for read/write via a signal line 219. Each row of the data array 201 corresponds to the respective row of the address array 200 by 1 to 1. When the Vbit of the address array 200 whose row corresponds to a certain lower address 211 is 1, it shows that the data array 201 possesses data equivalent to one block starting from the address formed of a combination of the upper address read from the address array 200 and the relevant lower address. When the Vbit is 0, it shows that the block stores no data.

When the address array 200 and the data array 201 follow a set associative system, the above-described address and the data array may be provided in a multi-plurality form. The present invention may be applicable to a cache in the set associative system without inconvenience.

Numerals 202, 203, 204 denote switches on the address line and 205, 206 switches on the data line. Numeral 209 denotes a control block for controlling the cache 11 as a whole. The control block 209 also holds an address necessary for the cache to transfer the block.

A description will subsequently be given of the operation of the cache 11 when it is accessed by the processor 10. The presence of the data accessed by a request source in the cache is called a hit. The cache checks whether it is hit whenever it is accessed. When the cache is accessed by the processor 10, it selects one row out of the address array 200 by means of the lower address 211 of an access address 13 and reads the contents. The upper address thus read is delivered to a signal line 212. The upper address on the signal line 212 is compared with an upper address 210 of the access address. If the addresses coincide with each other and if the Vbit of the address array 200 is 1, a hit is established. In other words, (address coincidence) x (V=1) constitutes a hit condition. In this case, a decision is made by a hit discriminator 208 and the result is transmitted via a signal line 214 to the control block 209.

When the processor 10 issues read access, the inside cache 11, if it is hit, supplies data corresponding to the access address thus hit from the data array 201 to the processor 10. In other words, the data is transferred from the data array 201 to the processor 10 via the signal line 219, the switch 205 and the processor data line 14. If the inside cache 11 is not hit, it means the absence of the data required therein and the inside cache 11 sends out a read request of the relevant block to the outside cache 12. Consequently, the upper address 210 and the lower address 211 are transmitted from the processor 10 via the switch 203 and the address line 15 between the caches to the outside cache 12 to obtain the relevant block from the outside cache 12 or the main memory 30. The relevant block is then stored in the data array 201 and simultaneously the data is supplied to the processor 10.

The control block 209 keeps controlling the signal transmission effected by the switches 202, 203, 204, 205, 206 to make possible the transfer of the address and the data.

When the processor 10 issues write access, the inside cache 11, if it is hit, writes data to the data array 201 and the outside cache 12 both and if it is not hit, writes data to the outside cache 12. That is, the inside cache 11 performs the write operation in the write through system.

Invalidation of the inside cache 11 will subsequently be described. As the inside cache 11 is informed of timing at which the main memory 30 is written as control signals such as the read/write discriminating signal of the main memory bus 31, the bus start signal and the like have been fed via the first path 35 and a signal line 218 to the control block 209 of the inside cache 11. The inside cache selects one row out of the address array 200 by means of the lower address 217 on the main address bus 31 whenever the write access is given on the main memory bus and reads the contents. The resulting read upper address is supplied to a signal line 213. The upper address on the signal line 213 is compared with an upper address 216 of the main memory bus 31 and if (address coincidence) x (Vbit=1), the relevant Vbit is rewritten to set 0 and the invalidation of the inside cache 11 is accomplished. Consequently, a decision on the coincidence of the addresses is made by a hit discriminator 207 and the result is transmitted via a signal line 215 to the control block 209. The Vbit is rewritten from 1 to 0 by means of the output of the control block 209.

Internal Configuration of Outside Cache

Figure 3:
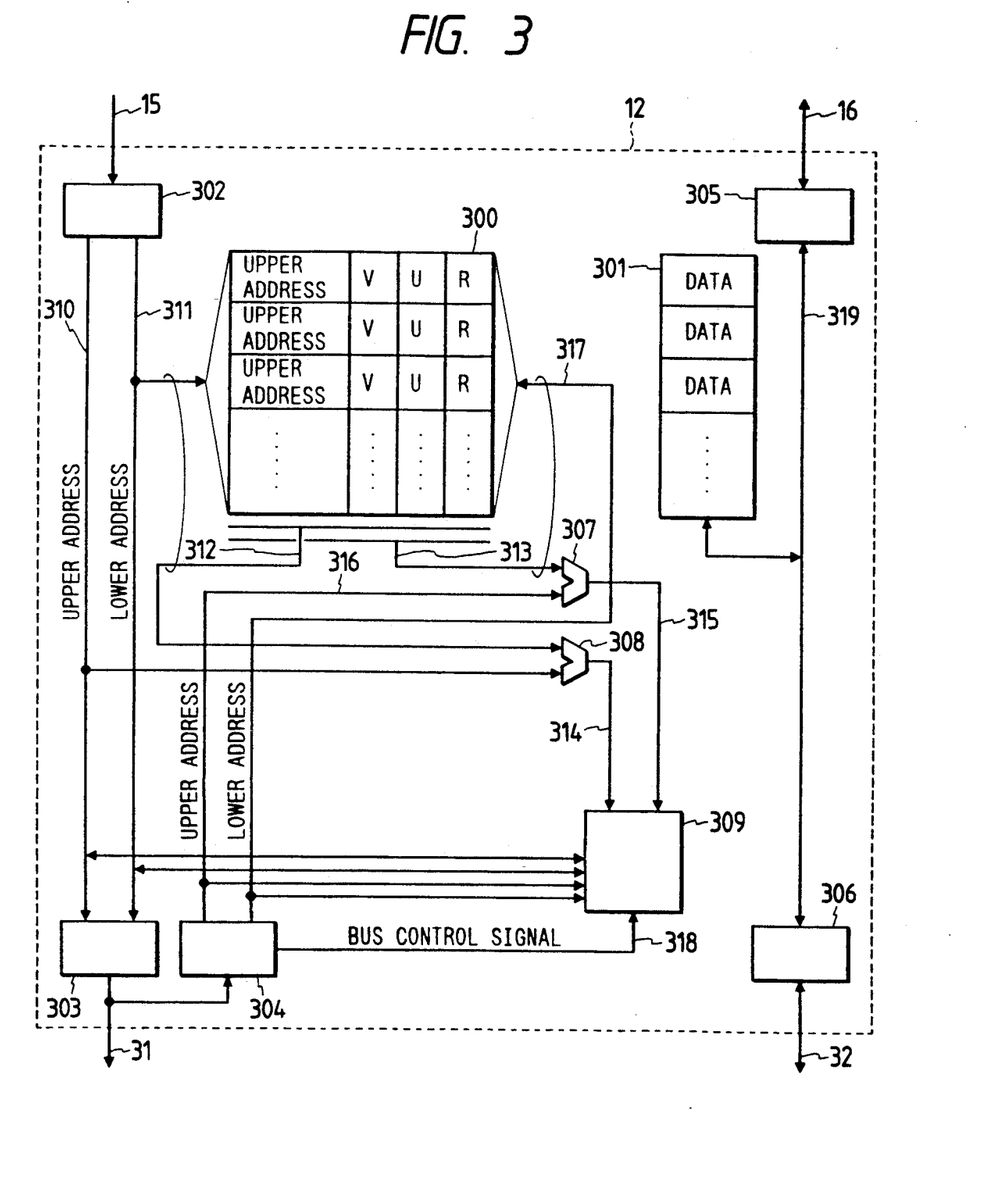
FIG. 3 is a block diagram showing the internal configuration of an outside cache within the system of FIG. 1.

FIG. 3 shows an internal configuration of the outside cache 12. As shown in FIG. 3, 300 through 319 are arranged substantially similar to 200 through 219 of the inside cache 11.

However, there are some differences therebetween. As compared with the address array 200, an address array 300 has an extra 2-bit memory unit per row. One of the bits is called an update bit (Ubit) and provided to make the copy back system possible. The other one bit is called a reserved bit (Rbit) and provided to make the write once system possible. The write-once system will be described later.

A control block 309 gives and receives addresses with addresses 316, 317 of the main memory bus 31. The control block 309 also receives V, U, R flags of the address array 300 directly (not shown).

A description will subsequently be given of the operation of the outside cache 12 when an access is issued from the inside cache 11.

When the inside cache 11 issues a read access, the outside cache 12, if it is hit, supplies data from a data array 301 to the inside cache 11. If the outside cache 12 is not hit, it means the absence of the data required therein and the outside cache 12 sends out a read request of the relevant block to the main memory 30. On obtaining the relevant block, the outside cache 12 supplies the data to the inside cache 11.

A detailed description will then be given of the write access operation of the outside cache 12 when the inside cache 11 issues 1 write access and the operation of monitoring the main memory address bus 31 by the outside cache 12.

Write Access of Outside Cache

The operation of outside cache 12 of FIG. 3 with the write access address received from the processor 10 via the inside cache 11 will be described first with reference to an operating flowchart of FIG. 4.

In accordance with the lower address of the above-described address supplied via the address line 15 between the caches, the upper address, Vbit, Ubit, Rbit are read from a row of the address array 300 of the outside cache 12 of FIG. 3. From the coincidence between the upper address thus read and the upper address of the supplied address, and from the Vbit, a decision is made on when the outside cache 12 is hit or missed in step 10 of FIG. 4. When it is hit, the operation shifts to a route on the right of Step 10, whereas when it is missed, the operation shifts to a route on the left thereof.

Figure 4:
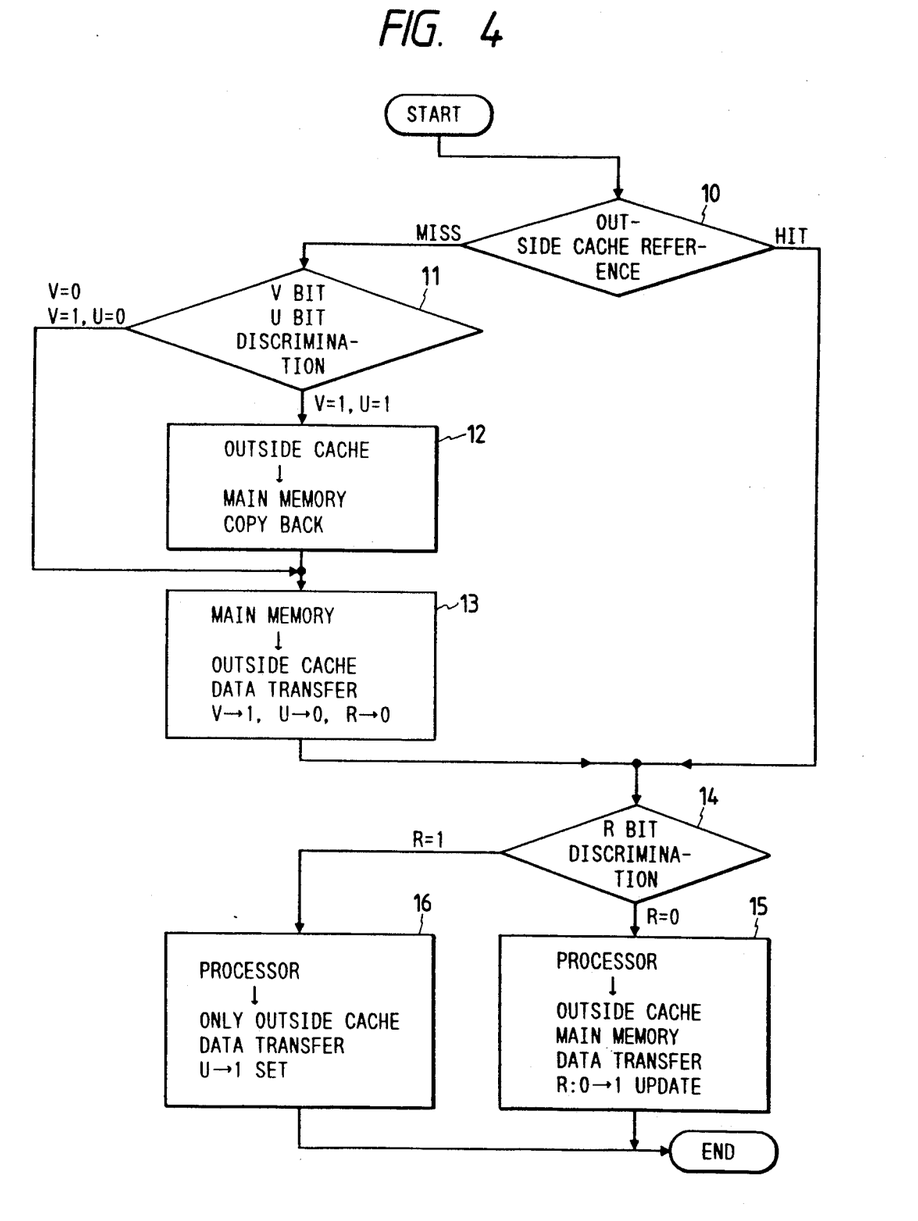
FIG. 4 is a performance flowchart for illustrating the operation of gaining write access to the outside cache.

In Step 11 of FIG. 4, the Vbit and the Ubit that have been read are examined: when V=1, U=1, -0 the operation proceeds to Step 12; and when V=0 or V=1, U=0, the operation proceeds to Step 13 by circumventing Step 12.

More specifically, the fact that V=1, U=1 at the time of miss means the data stored in the outside cache 12 and also corresponding to the lower address fails to correspond to the data which is stored in the main memory 30 and is corresponding to the lower address. As a result, it is required to perform the operation of returning the previous data of the missed address from the outside cache 12 to the main memory 30 (copy back) before new data is written to the missed address. If the copy back operation is omitted, an impropriety occurs such that the previous data can exist in neither outside cache 12 or main memory 30 after Step 13.

The copy back operation shown in Step 12 of FIG. 4 is for evading the aforementioned impropriety. When the copy back is processed, the lower address is concatenated with the upper address read from the address array 300 of the outside cache 12 in accordance with the lower address to form an address first. Then data of one block corresponding to the lower address is read from the data array 301 of the outside cache 12. The data of one block thus read is written to the main memory 30 according to the concatenated address. The copy back process is thus completed.

When V=0 or V=1, U=0, the copy back process 12 is considered unnecessary and the operation proceeds to storing data in the outside cache to deal with a case of miss in Step 13.

In Step 13 for dealing with the case of miss, data is read from the main memory 30 in accordance with the lower address and the upper address issued from the processor 10. The data thus read and the upper address are written to respective rows designated by the lower address in the data array 301 and the address array 300 of the outside cache 12. Simultaneously, the relevant flag of the outside cache 12 is set at V=1, U=0, R=0.

The right route of Step 10 and Step 13 is followed by the Rbit decision in Step 14. The Rbit is what belongs to the row read from the address array 300 of the outside cache in accordance with the lower address of the address issued from the processor 10. When R=0, Step 15 is followed, whereas when R=1, Step 16 is followed.

When R=0, the write-once operation is performed in Step 15. In Step 15, data is written to the outside cache 12 and the main memory 30 in accordance with the address issued from the processor 10. Moreover, the relevant Rbit in the outside cache 12 is rewritten from 0 to 1 when data is written to the main memory 30. The process in Step 15 is different from write access in the normal copy back system and when R=0, data is written to not only the private cache at the time of hit but also to the main memory 30 once in accordance with the relevant address. Therefore, it is called writing in the write-once system.

When R=1, on the other hand, the writing operation in the copy back system at the time of normal hit is performed in Step 16. In other words, data is written to the outside cache 12 in accordance with the address issued from the processor 10. However, no address is transmitted to the main memory 30, nor is data written to the main memory 30. When data is written to the outside cache 12, the relevant Ubit of the outside cache 12 is set at 1.

With the completion of the process in Step 15 or 16, there is completed the operation of the outside cache 12 in receipt of the address for write access from the processor 10 via the inside cache 11.

Rewriting of Main Memory by Input/Output Device

In reference to the multi-processor system of FIG. 1, consideration is given to a case where data D at a specific address in the main memory 30 is rewritten to provide data D' by one input/output device 33 while the copy of the data D at the specific address of the main memory 30 is held in the inside caches 11, 21 and the outside caches 12, 22. It is well known practice to invalidate the relevant data of the cache at the time such data of the main memory is updated.

When the data is updated, the aforementioned specific address is supplied from the input/output device 33 to the main memory address bus 31, whereas the updated data D' is supplied from the input/output device 33 to the main memory data bus 32. The specific address on the main memory address bus 31 is utilized as an invalidation address for invalidating caches.

As the invalidation address is transmitted via the first and the second path 35, 36 to the inside caches 11, 21, these inside cashes are invalidated. Moreover, the invalidation address is transmitted to the outside caches 12, 22 via the bidirectional connections between the address bus 31 and the outside caches 12, 22, and these outside cashes are invalidated thereby.

After the invalidation of the caches, the processor 10 issues the specific address to gain the updated data D' for reading, whereby the updated data D' is brought to and stored in the inside and the outside cache 11, 12 from the main memory 30.

In this way, the coherence of the main memory 30 to the inside and the outside caches 11, 21, 12, 22 is maintained in the multi-processor system.

Rewriting of Main Memory by Processor

The operation of the cache prior to rewriting will be described first.

The outside caches 12, 22 both are left invalidated at V=0, U=0, R=0 on the assumption that, in the multi-processor system of FIG. 1, the inside and the outside caches 11, 21, 12, 22 remain stored with no data (i.e., empty).

When the processor 20 gains access for reading data by issuing a specific address in this state, a cache miss occurs in the inside and the outside cache 21, 22, and the main memory 30 is accessed. The data D corresponding the address issued is transferred from the main memory 30 to the outside and the inside cache 22, 21 for storage. The storage of the data D in the outside cache 22 causes the invalid state V=0, U=0, R=0 of the outside cache 22 to change to the valid state V=1, U=0, R=0.

Consideration will then be given to a case where the processor 10 gains access for writing in such a manner as to update the data D corresponding to the specific address to data D'.

A cache miss occurs in the inside cache 11 at this time and the updated data D' is not written to the inside cache 11.

Since a cache miss also occurs in the outside cache 12, the operation shifts to the route on the left in FIG. 4 and Vbit/Ubit discrimination is made in Step 11. As the outside cache 12 remains invalid, the operation proceeds from Step 11 to Step 13 of FIG. 4 and data of one block including the data D is transferred from the main memory 30 to the outside cache 12. When the data is thus transferred, the setting of V=1, U=0, R=0 is carried out at the relevant address in the outside cache 12.

Since R=0, the operation proceeds to Step 15 via Step 14 and the data D' is written to the outside cache 12 and the main memory 30 by the processor 10 in Step 15 and the Rbit of the outside cache 12 is modified from 0 to 1. Moreover, the address on the main memory address bus 31 is supplied to the outside and the inside cache 22, 21 as an invalidation address when the data is written to the main memory 30, whereby the data of each block including the data D stored in the outside and the inside cache 22, 21 is invalidated.

Consideration is further given to the operation of the processor 10 that gains access for writing in order to update the data D' to data D" again. At this time, the inside cache also undergoes a miss and the data D" is not stored in the inside cache 11. On the other hand, the outside cache 12 is hit this time and the operation shifts from the right side in Step 10 of FIG. 4 to Rbit discrimination in Step 14. As the setting of R=1 is effected when the data D is modified to the data D', Step 16 is then followed and the data D" modified more than once is stored in the outside cache 12 but not stored in the main memory 30. When the data D" thus modified more than once is stored in the outside cache 12, the relevant Ubit in the outside cache 12 is set at 1.

In this way, the Rbit of the outside cache 12 is utilized to have the main memory accessed for writing when the data at the specific address is modified exactly once, whereas when the data at the specific address is modified more than once, the main memory is prevented from being accessed for writing. Under the control of the Rbit, the outside cache 12 thus performs the write operation in the write once system and rarely delivers an address to the main memory address bus 31 because the cache hitting rate is high. Accordingly, the outside cache 12 can receive the invalidation address via the bidirectional address bus from the main memory address bus 31.

A description will subsequently be given of a procedure for dealing with the conflict between writing in the write operation and the reception of the invalidation address in the write once system.

In order to deal with the aforementioned conflict, the outside cache is provided with a function of monitoring the main memory address bus.

The monitoring function will subsequently be described.

Monitoring of Main Memory Address Bus by Outside Cache

A description will be given of the operation of the outside cache 12 of FIG. 3 in response to the read or write access address of the main memory address bus 31 with reference to an operating flowchart of FIG. 5.

Figure 5:
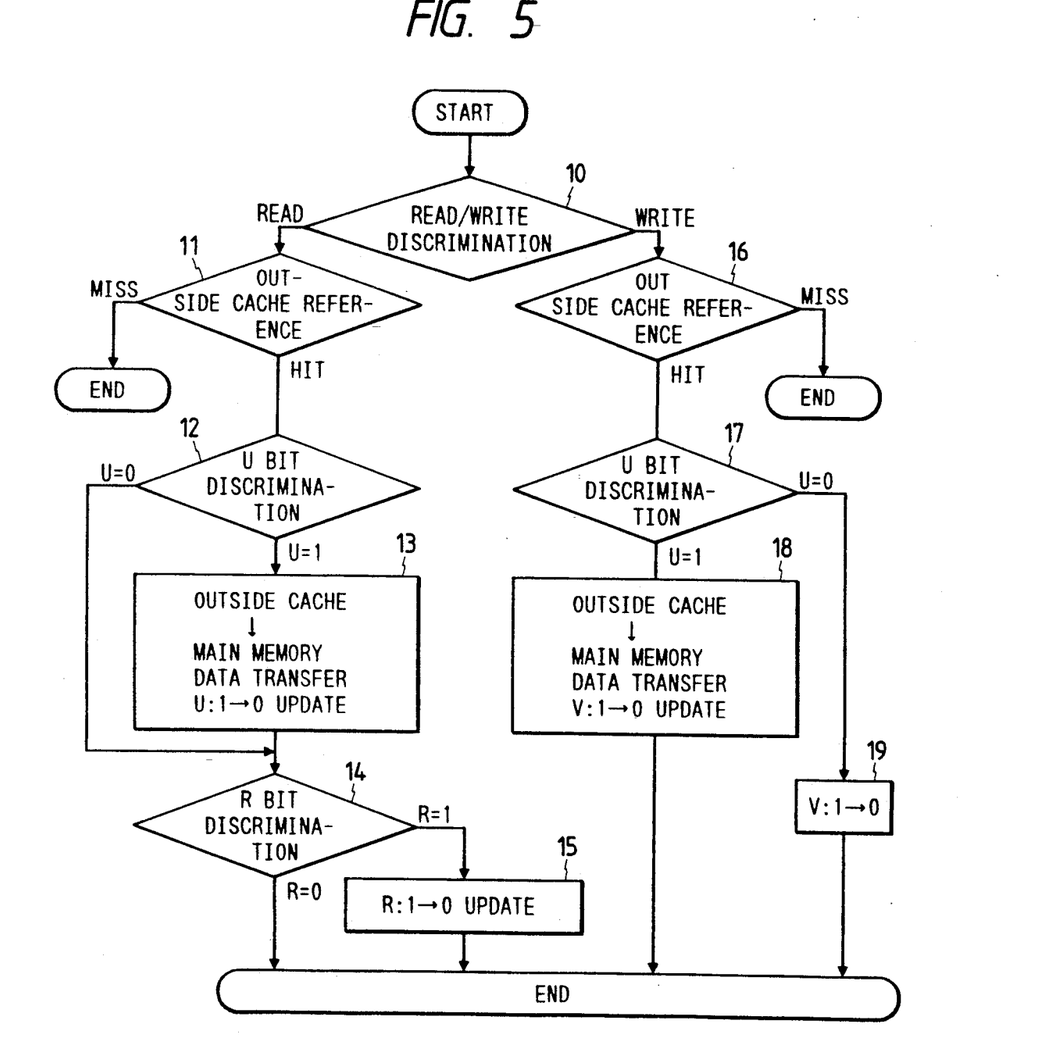
FIG. 5 is a performance flowchart for illustrating the operation of monitoring the main memory address bus of the outside cache.

A controller 309 of the outside cache 12 of FIG. 3 discriminates between a read and a write request directed to the main memory address bus 31 in Step 10 of FIG. 5 in response to the read/write discriminating signal of the main memory address bus 31. If it is a read request, the operation shifts to the left route of Step 10 of FIG. 5, whereas if it is a write request, the operation follows the right route of Step 10.

In Step 11, a decision is made on whether a read access address has hit or missed the outside cache.

When the address has missed the cache, the operation follows the left route of Step 11 and terminates because the read access of the main memory address bus 31 means nothing to the outside cache 12.

When the address has hit the cache otherwise, the relation of the read access of the main memory address bus 31 to the data stored in the outside cache 12 poses a problem and consequently the Ubit discriminating operation in Step 12 is followed. In other words, the Ubit is read from the address array 300 of the outside cache 12 in accordance with the read access address to discriminate between U=0 and U=1.

When U=1, it is followed by the operation in Step 13 as the data based on the read access request is updated only in the outside cache 12.

In Step 13, the data based on the read access request is transferred from the outside cache 12 to the main memory 30 and then the Ubit of the outside cache 12 is modified from 1 to 0.

After Step 13 or when U=0, it is followed by the operation in Step 14 to discriminate between R=1 and R=0. When R=1, the outside cache 12 modifies the data corresponding to the specific address exactly once, which means the data corresponding to the specific address in the caches 21, 22 has been invalidated. However, the read access on the main memory bus 31 shows or suggests that the processor 20 may gain access for reading the main memory 30 with the specific address and allow the caches 21, 22 to hold the copy of the data thus read from the main memory 30. When the processor 10 gains access for writing to modify the data at the specific address more than once, the specific address is caused to hit the outside cache and since R=1, the operation proceeds to Step 16 of FIG. 4. As a result, the data is modified more than once in only the outside cache and the caches 21, 22 cannot be invalidated because no address is supplied to the main memory address bus 31. In order to avoid this contradiction, the operation in Step 15 of FIG. 5 is followed when R=1 and terminated as the Rbit is modified from 1 to 0. When R=0, the operation is immediately terminated.

With the write request made, the operation shifts to the right route of Step 10 of FIG. 5.

In Step 16, a decision is made on whether the write access address has hit or missed the outside cache.

When the address has missed the cache, the operation follows the right route of Step 16 and terminates because the write access of the main memory address bus 31 means nothing to the outside cache 12.

When the address has hit the cache otherwise, the relation of the write access of the main memory address bus 31 to the data stored in the outside cache 12 poses a problem and consequently the Ubit discriminating operation in Step 17 is followed. In other words, the Ubit is read from the address array 300 of the outside cache in accordance with the write access address to discriminate between U=0 and U=1.

When U=1, it is followed by the operation in Step 18 as the data based on the write access request is updated only in the outside cache 12.

In Step 18, the previous data based on the write access request is transferred from the outside cache 12 to the main memory 30 and then the Vbit of the outside cache 12 is modified from 1 to 0 to invalidate the relevant block of the outside cache 12.

In the main memory 30, new data in conformity with the write access request is superposed on the previous data returned from the outside cache 12.

When U=0, the Vbit is reset from 1 to 0 and the Rbit is set at 0 to simply invalidate the relevant block of the outside cache 12 and the operation is terminated. In other words, when U=0 in Step 17, it is followed by the operation in Step 19 and the Vbit is modified from 1 to 0 to terminate the operation.

A description will be given again of the signal conflict that has been called in question before. In other words, the difference between the timing of writing to the outside cache 12 in the write once system and that of generating the invalidation address on the main memory address bus 31 results in solving the problem of the signal conflict as follows:

When the former (writing) is quicker than the latter (generating the invalidating address), the writing to the outside cache 12 in the write once system (Step 15 of FIG. 4) causes the other caches 21, 22 to be invalidated first. Then the data is transferred from the input/output device 33 via the buses 31, 32 to the main memory 30. Consequently, it is not problematical at all even if the invalidation address is supplied from the bus 31 to the outside cache 12.

Provided the latter (generating the invalidating address) is quicker than the former (writing), on the other hand, the Ubit is 0 as the outside cache 12 is situated immediately before writing of the write once system. As a result, the outside cache 12 is invalidated by following the route along Steps 10, 16, 17, 19 of FIG. 5 in response to the invalidation address on the main memory address bus 31. Since the Rbit and the Vbit become 0 then, the write operation thereafter follows the route along Steps 10, 11, 13, 14, 15 of FIG. 4 while causing the cache miss to the outside cache 12, whereby write access is implemented in the write once system.

In other words, if the hit rate of write access from the processor to the outside cache which operates in copy back system were 100%, none of the addresses of the write access from the processor would be transmitted to the main memory address bus so that any conflict with an invalidation address cannot occur.

If data of a specific address is modified more than once through the outside cache which operates in the write-once system, none of the addresses of the write access from the processor is transmitted to the main memory address bus so that any conflict with an invalidation address cannot occur.

If data of a specific address is modified exactly once through the outside cache which operates in the write-once system, the address of the write access from the processor is transmitted to the main memory address bus so that a conflict with the invalidation address may occur. However, in this case, the time difference between the timing of write access of the write once system outside cache and that of generating the invalidation address guarantees both operations of write access from the outside cache and invalidation from the main memory bus so that the problem of signal conflict can be resolved.

The following effects are achieved in the embodiment of the present invention as set forth above:

(1) Since the address arrays 200, 300 in the inside and the outside cache both respectively comprise dual port RAMs, the access address from the processor and the invalidation address from the main memory address bus can be processed in parallel so that data processing efficiency is raised.

(2) Since the outside caches 12, 22 are operated in either copy back or write once system, it is extremely improbable for the address and the invalidation address to conflict with each other at the time of write access. Moreover, the bidirectional connections can be provided between the address outputs of the outside caches 12, 22 and the main memory address bus 31. Consequently, the number of address terminals of the outside caches 12, 22 becomes reducible.

The present invention is not limited to the above-described embodiment but needless to say technically modifiable in form within the spirit and the scope of the invention.

In reference to FIG. 1, for instance, the memory 30 may be formed into a three-layer cache as a shared cache to provide the main memory as a memory on the fourth layer. A plurality of shared caches on the third layer is disposed in order that a second main memory address bus and a second main memory data bus may be connected between the plurality of shared caches on the third layer and the main memory on the fourth layer.

Moreover, the processor 10 and the inside cache 20 may be formed into one semiconductor chip.

With rapid improvement in ULSI density as a background, the two processors 10, 20, the two inside caches 11, 21 and the two outside caches 12, 22 can be formed into one semiconductor chip. In this case, the paths 35, 36 may be combined into one for common use and provided outside the semiconductor chip, whereby the number of paths for wiring can be decreased.

In the multi-processor system disclosed by the invention which is a non-shared system with respect to the outside and the inside cache of the hierarchical cache, the problems brought about when the processor (CPU) demands write access to the inside and the outside cache memory and demands to invalidate the cache can be solved without trouble on one hand, and reduction in the number of address terminals of the outside cache memory can be made possible on the other.

What is claimed is:

1. A multi-processor system comprising:
   (1) a first processor for generating a first address to a first processor address line;
   (2) a first inside cache memory to be accessed by said first processor in accordance with the first address on said first processor address line;
   (3) a first outside cache memory to be accessed by said first processor in accordance with the first address on a first cache address line between said first inside cache memory and said first outside cache memory;
   (4) a second processor for generating a second address to a second processor address line;
   (5) a second inside cache memory to be accessed by said second processor in accordance with the second address on said second processor address line;
   (6) a second outside cache memory to be accessed by said second processor in accordance with the second address on said second cache address line between said second inside cache memory and said second outside cache memory;
   (7) an address bus connected to said first and second outside cache memories by bidirectional first and second connections, respectively, and to which the first address transmitted from said first processor can be therein received via said first outside cache memory and the second address transmitted from said second processor can be therein received via said second outside cache memory;
   (8) a data bus for transmitting data and connected to said first outside cache memory for communicating the data to said first processor and said first inside cache memory and connected to said second outside cache memory for communicating the data to said second processor and said second inside cache memory;
   (9) memory means connected to said address bus and said data bus, said memory means being accessed by said first address which is transmitted from said first processor via said first processor address line, said first inside cache memory, said first cache address line, said first outside cache memory and said bidirectional first connection to said address bus and accessed by said second address which is transmitted from said second processor via said second processor address line, said second inside cache memory, said second cache address line, said second outside cache memory and said bidirectional second connection to said address bus; and
   (10) first and second paths for respectively directly connecting said address bus with said first inside cache memory and said second inside cache memory for direct reception of addresses at the inside cache memories form the address bus by circumventing said first outside cache memory and said second outside cache memory,
   wherein said first inside cache memory and said second inside cache memory operate in a write through system,
   wherein said first outside cache memory and said second outside cache memory operate in at least one of a copy back system in which no address of write access is transmitted to said address bus at the time of cache hit and a write once system in which no address of write access is transmitted to said address bus when data of a specific address is modified more than once, and
   wherein an invalidation address on said address bus which is generated in accompaniment with rewriting of said memory means is transmitted to said first cache inside memory, said second inside cache memory, said first outside cache memory and said second outside cache memory through said first path, said second path, said bidirectional first connection and said bidirectional second connection, respectively.

2. The multi-processor system as claimed in claim 1, further comprising an input/output device connected to said address bus and said data bus, wherein addresses and data are transferred via said address bus and said data bus, respectively, from said input/output device to said memory means, and wherein an address being transferred on said address bus is supplied via said first and second paths to said first and second inside caches, respectively and supplied via said first and second connections to said first and said second outside caches, whereby any data held in said caches related to said address is invalidated.

3. The multi-processor system claimed in claim 2, wherein said memory means is a main memory.

4. The multi-processor system as claimed in claim 1, wherein said first inside cache has a dual port RAM comprising a first address array capable of being accessed in parallel by means of the first address from said first processor and the addresses on said address bus via said first path, wherein said second inside cache has a dual port RAM comprising a second address array capable of being accessed in parallel by means of the second address from said second processor and the addresses on said address bus via said second path, wherein said first outside cache has a dual port RAM comprising a third address array capable of being accessed in parallel by means of the first address from said first processor and the addresses on said address bus via said first connection, and wherein said second outside cache has a dual port RAM comprising a fourth address array capable of being accessed in parallel by means of the second address from said second processor and the addresses on said address bus via said second connection.

5. The multi-processor system as claimed in claim 2, wherein said first inside cache has a dual port RAM comprising a first address array capable of being accessed in parallel by means of the first address from said first processor and the addresses on said address bus via said first path, and wherein said second inside cache has a dual port RAM comprising a second address array capable of being accessed in parallel by means of the second address from said second processor and the addresses on said address bus via said second path, wherein said first outside cache has a dual port RAM comprising a third address array capable of being accessed in parallel by means of the first address from said first processor and the addresses on said address bus via said first connection, and wherein said second outside cache has a dual port RAM comprising a fourth address array capable of being accessed in parallel by means of the second address from said second processor and the addresses on said address bus via said second connection.

6. The multi-processor system as claim in claim 3, wherein said first inside cache has a dual port RAM comprising a first address array capable of being accessed in parallel by means of th e first address from said first processor and the addresses on said address bus via said first path, wherein said second outside cache has a dual port RAM comprising a second address array capable of being accessed in parallel by means of the second address from said second processor and the addresses on said address bus via said second path, wherein said first outside cache has a dual port RAM comprising a third address array capable of being accessed in parallel by means of the first address from said first processor and the addresses on said address bus via said first connection, and wherein said second outside cache has a dual port RAM comprising a fourth address array capable of being accessed in parallel by means of the second address from said second processor and the addresses on said address bus via said second connection.

7. The multi-processor system as claimed in claim 1, wherein said first and second outside cache memories include means for monitoring the addresses on said address bus for demanding a write access on said address bus via said first and second connections, when at least one of said first and second outside cache memories receives a hit of a one of said addresses and when the data related to said one address thus hit is not updated only in said hit cache, said hit cache including means for invalidating the data related to the one address and for selectively setting a bit instruction of the writing of the data to the hit cache and the memory means in a write once system at a time of the write access related to said one address.

8. The multi-processor system as claimed in claim 7, wherein said memory means is a main memory.

9. The multi-processor system as claimed in claim 7, wherein said first inside cache has a dual port RAM comprising a first address array capable of being accessed in parallel by means of the first address from said first processor and the addresses on said address bus via said first path, wherein said second inside cache has a dual port RAM comprising a second address array capable of being accessed in parallel by means of the second address from said second processor and the addresses on said address bus via said second path, wherein said first outside cache has a dual port RAM comprising a third address array capable of being accessed in parallel by means of the first address from said first processor and the addresses on said address bus via said first connection, and wherein said second outside cache has a dual port RAM comprising a fourth address array capable of being accessed in parallel by means of the second address from said second processor and the addresses on said address bus via said second connection.

10. The multi-processor system as claimed in claim 8, wherein said first inside cache has a dual port RAM comprising a first address array capable of being accessed in parallel by means of the first address from said first processor and the addresses on said address bus via said first path, wherein said second inside cache has a dual port RAM comprising a second address array capable of being accessed in parallel by means of the second address from said second processor and the addresses on said address bus via said second path, wherein said first outside cache has a dual port RAM comprising a third address array capable of being accessed in parallel by means of the first address from said first processor and the addresses on said address bus via said first connection, and wherein said second outside cache has a dual port RAM comprising a fourth address array capable of being accessed in parallel by means of the second address from said second processor and the addresses on said address bus via said second connection.

* * * * *